(12) United States Patent
Sodagar

(10) Patent No.: US 11,765,218 B2
(45) Date of Patent: Sep. 19, 2023

(54) METHOD FOR DISCOVERY OF MEDIA SERVICE ENTRY FOR UPLINK AND DOWNLINK STREAMING IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/725,940

(22) Filed: Apr. 21, 2022

(65) Prior Publication Data

US 2022/0368750 A1 Nov. 17, 2022

Related U.S. Application Data

(60) Provisional application No. 63/187,811, filed on May 12, 2021.

(51) Int. Cl.
*H04L 65/65* (2022.01)
*H04W 4/50* (2018.01)

(52) U.S. Cl.
CPC ........... *H04L 65/65* (2022.05); *H04W 4/50* (2018.02)

(58) Field of Classification Search
CPC ... H04L 65/65; H04L 65/1063; H04L 65/612; H04L 65/756; H04L 65/764; H04L 65/1016; H04W 4/50
See application file for complete search history.

(56) References Cited

U.S. PATENT DOCUMENTS

| | | | | |
|---|---|---|---|---|
| 11,431,779 | B2* | 8/2022 | Ljung | H04L 65/613 |
| 2011/0321096 | A1* | 12/2011 | Landow | H04N 21/8126 725/41 |
| 2014/0013375 | A1 | 1/2014 | Giladi | |
| 2019/0075467 | A1 | 3/2019 | Mouquet et al. | |

(Continued)

FOREIGN PATENT DOCUMENTS

| | | |
|---|---|---|
| WO | 2018/210411 A1 | 11/2018 |
| WO | 2019/111033 A1 | 6/2019 |

OTHER PUBLICATIONS

ETSI TS~26 501 V16.6.1 (Jan. 2021); (3GPP TS 26 501 version 16.6.1 Release 16) (Year: 2021).*

(Continued)

*Primary Examiner* — Sm A Rahman
(74) *Attorney, Agent, or Firm* — Sughrue Mion, PLLC

(57) ABSTRACT

Systems, devices, and methods for managing capabilities of a 5G media streaming (5GMS) network, including obtaining a streaming access object corresponding to 5GMS media content; obtaining a media service entry based on the streaming access object, wherein the media service entry includes a protocol identifier corresponding to the media service entry, and a service entry uniform resource locator (URL) corresponding to the media service entry; and performing at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content.

11 Claims, 5 Drawing Sheets

(56) References Cited

U.S. PATENT DOCUMENTS

2021/0006614 A1* 1/2021 Oyman .................. H04L 65/70

OTHER PUBLICATIONS

"3rd Generation Partnership Project; Technical Specification Group Services and System Aspects; 5G Media Streaming (5GMS); General description and architecture (Release 16)", 3GPP TS 26.501 V16.3.1, Mar. 2020, pp. 1-63.
"3rd Generation Partnership Project; Technical Specification Group Services and System Aspects; 5G Media Streaming (5GMS); Protocols (Release 16)", 3GPP TS 26.512 V16.1.0, Dec. 2020, pp. 1-96.
3GPP. "ETSI TS 126 501 V16.6.1". 3rd Generation Partnership Project . . . Jan. 2021; [retrieved Jul. 26, 2022], Retrieved from the Internet: <URL https://www.etsi.Org/standards-search#Pre-defined%20Collection >; pp. 7-8, 16-17, 26-27, 31, 35, 43, 50, 55, 62 (77 pages).
International Search Report dated Aug. 9, 2022, issued in International Application No. PCT/US22/28671.
Written Opinion dated Aug. 9, 2022, issued in International Application No. PCT/US22/28671.
3rd Generation Partnership Project; Technical Specification Group Services and System Aspects; 5G Media Streaming (5GMS); Protocols (Release 16); 3GPP TS 26.512 vi6.2.0(Apr. 9, 2021).
Extended European Search Report dated May 17, 2023 in European Application No. 22768601.1.

* cited by examiner

METHOD FOR DISCOVERY OF MEDIA SERVICE ENTRY FOR UPLINK AND DOWNLINK STREAMING IN 5G NETWORKS

CROSS-REFERENCE TO RELATED APPLICATION

This application claims priority from U.S. Provisional Application No. 63/187,811, filed on May 12, 2021, in the United States Patent and Trademark Office, the disclosure of which is incorporated herein by reference in its entirety.

FIELD

Embodiments of this disclosure are directed to media processing and streaming methods and systems, more particularly to discovery of media service entry for uplink and downlink streaming in $5^{th}$ generation (5G) networks.

BACKGROUND

The current 5G media streaming architecture defined in 3GPP TS26.501 (3GPP TS 26.501, 3rd Generation Partnership Project; Technical Specification Group Services and System Aspects; 5G Media Streaming (5GMS); General description and architecture (Release 16), V16.3.1) defines the general architecture for uplink and downlink media streaming. 3rd Generation Partnership Project (3GPP) TS26.512 (3rd Generation Partnership Project; Technical Specification Group Services and System Aspects; 5G Media Streaming (5GMS); Protocols (Release 16), V1.1.0) defines the concept of uplink streaming where the content is streamed from the device to an external Service Provider, but does not define a service entry for uplink streaming. In addition, the service entry for downlink streaming is very limited.

SUMMARY

According to one or more embodiments, a method of managing capabilities of a 5G media streaming (5GMS) network using at least one processor includes obtaining a streaming access object corresponding to 5GMS media content; obtaining a media service entry based on the streaming access object, wherein the media service entry includes a protocol identifier corresponding to the media service entry, and a service entry uniform resource locator (URL) corresponding to the media service entry; and performing at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content.

According to one or more embodiments, a device for managing capabilities of a 5GMS network includes at least one memory configured to store program code; and at least one processor configured to read the program code and operate as instructed by the program code, the program code including: first obtaining code configured to cause the at least one processor to obtain a streaming access object corresponding to 5GMS media content; second obtaining code configured to cause the at least one processor to obtain a media service entry based on the streaming access object, wherein the media service entry includes a protocol identifier corresponding to the media service entry, and a service entry uniform resource locator (URL) corresponding to the media service entry; and performing code configured to cause the at least one processor to perform at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content.

According to one or more embodiments, a non-transitory computer-readable medium stores instructions including one or more instructions that, when executed by one or more processors of a device for managing capabilities of a 5GMS network, cause the one or more processors to: obtain a streaming access object corresponding to 5GMS media content; obtain a media service entry based on the streaming access object, wherein the media service entry includes a protocol identifier corresponding to the media service entry, and a service entry uniform resource locator (URL) corresponding to the media service entry; and perform at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
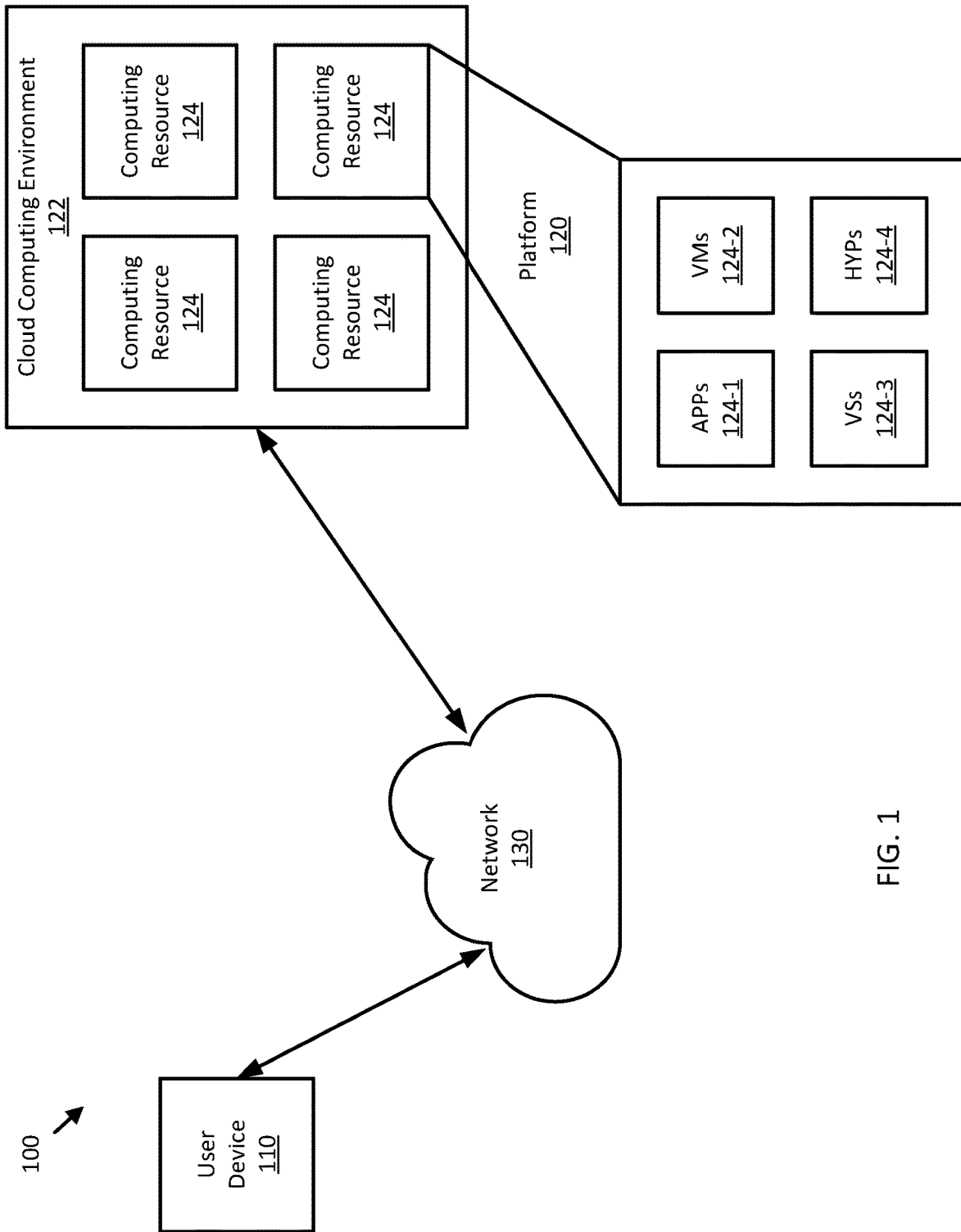
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
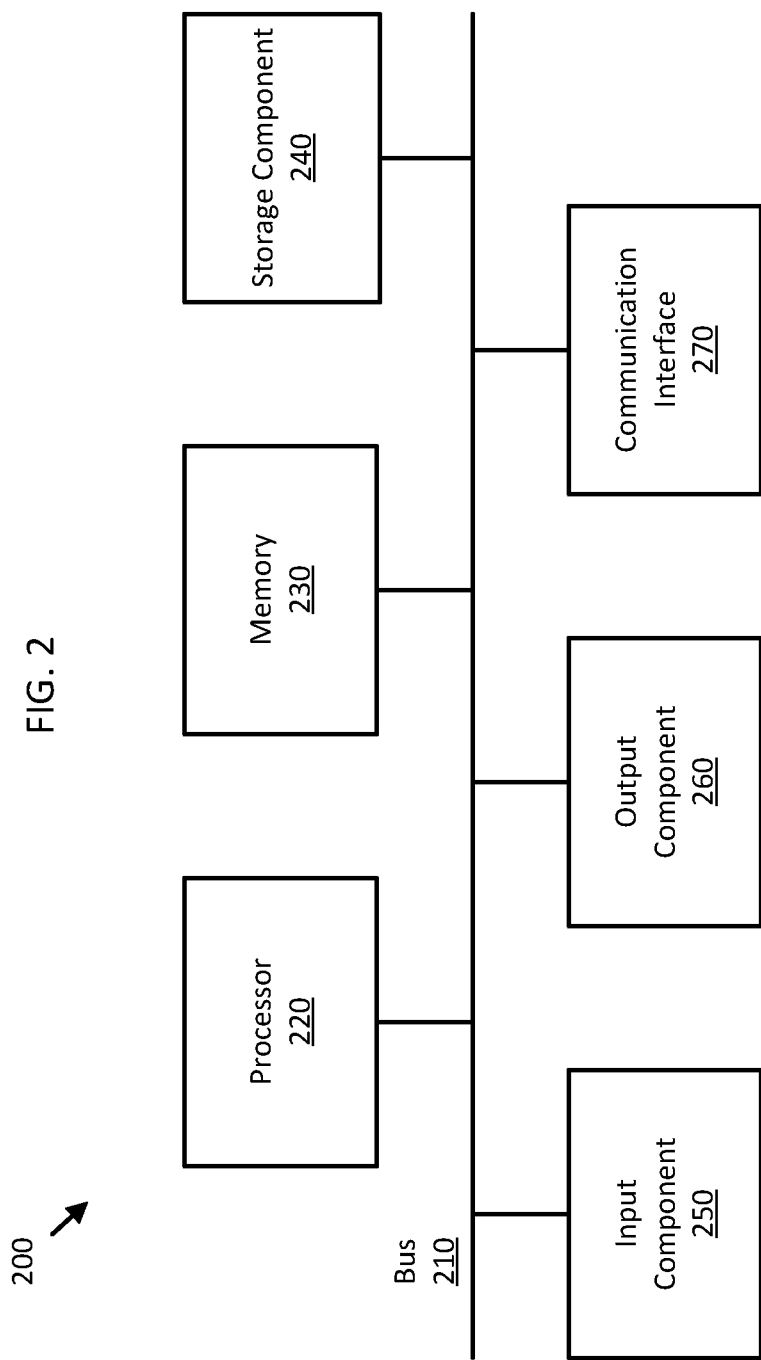
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
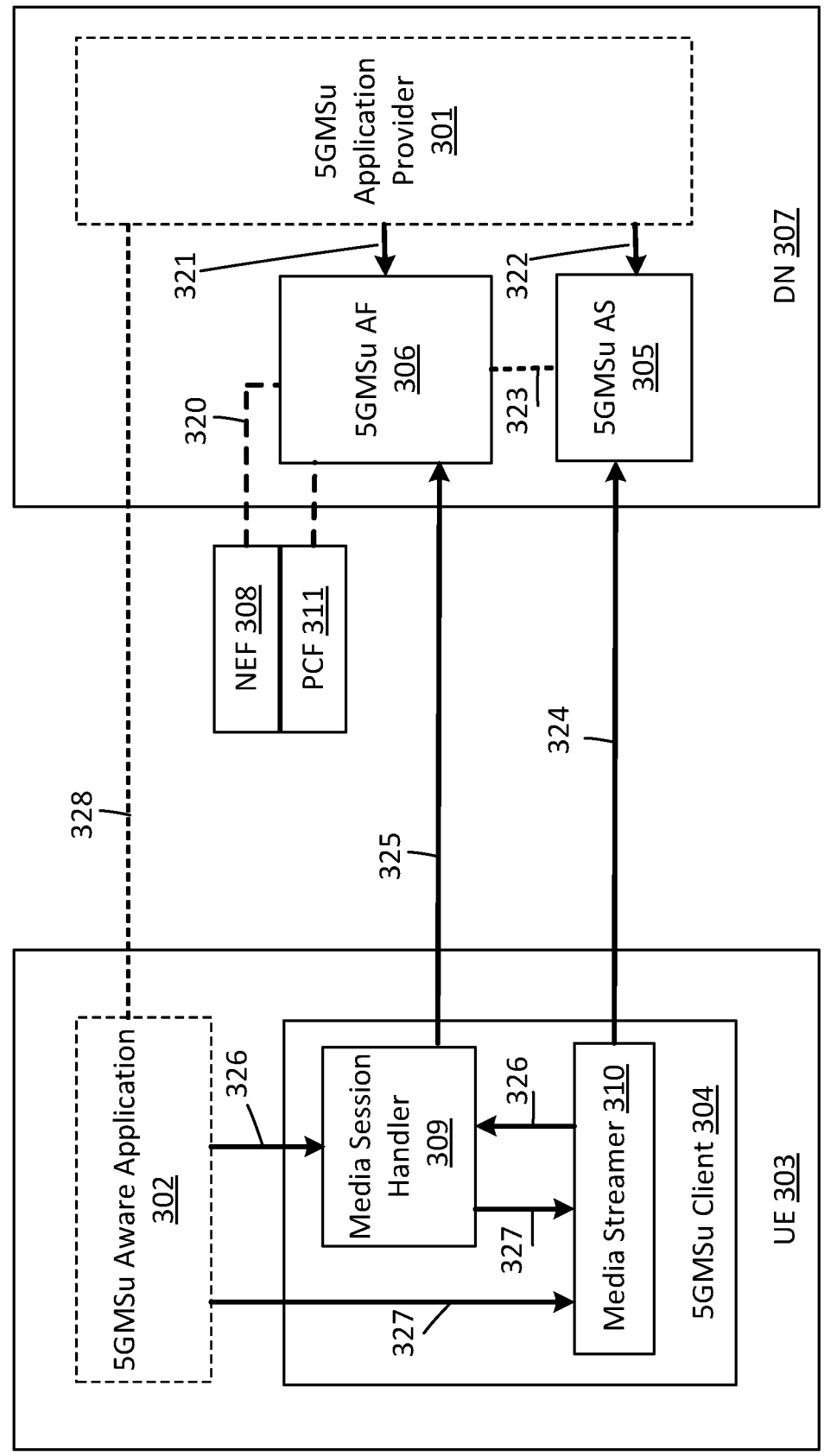
FIG. 3 is a block diagram of a media architecture for media uplink streaming, according to embodiments.
Figure 4:
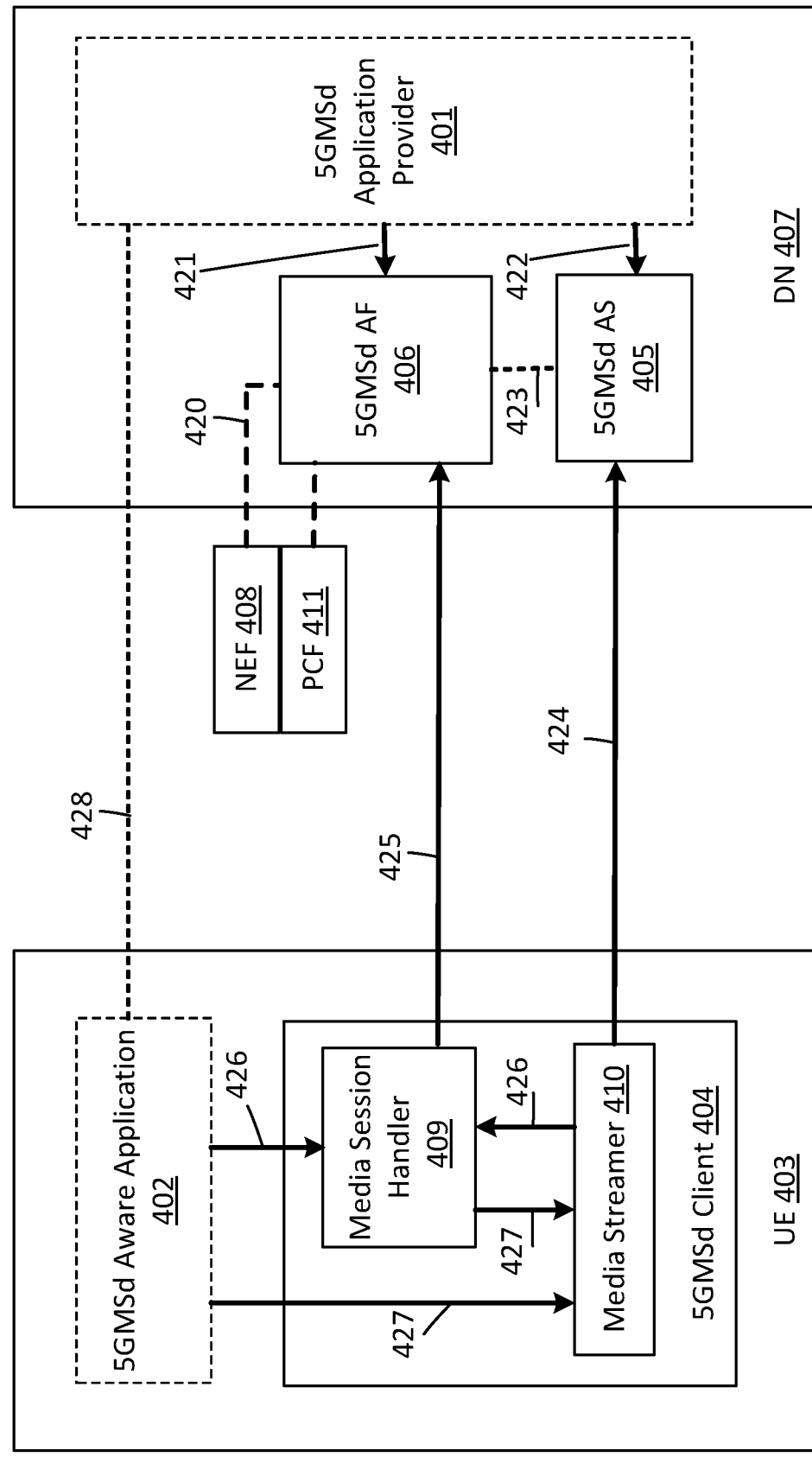
FIG. 4 is a block diagram of a media architecture 400 for media downlink streaming, according to embodiments.

A 5G media-streaming architecture for downlink and uplink streaming is shown in FIGS. 3 and 4.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 303 by implementing external application or content service provider specific logic and enabling the establishment of a media session. 5GMSu AS 305 may host 5G media functions. 5GMSu Application Provide 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interface. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

FIG. 4 is a diagram of a media architecture 400 for media downlink streaming. A 5G media streaming downlink (5GMSd) Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd Application Server (AS) may be an AS dedicated to 5G Media Downlink Streaming. 5GMSd Client 404 may be a UE 403 internal function dedicated to 5G Media Downlink Streaming.

5GMSd Application Function (AF) 406 and 5GMSd AS 405 may be Data Network (DN) 407 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 403 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different Policy or Charging Function (PCF) 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

As discussed above, while 3GPP TS26.512 defines the general uplink process, it does not define a service entry for uplink streaming. In addition, the service entry for downlink streaming is very limited.

For downlink streaming, TS26.512 defines a StreamingAccess object as part of ServiceAccessInfromation resource. As is shown in the following table, the StreamingAccess object includes a URL string that points to a URL for downloading a media or a manifest that describe the media presentation.

TABLE 1

Service entry for downlink streaming in TS26.512

| Property name | Type | Cardinality | Usage | Description |
|---|---|---|---|---|
| provisioningSessionId | String | 1 . . . 1 | RO | Unique identification of the M1d Provisioning Session. |
| StreamingAccess | Object | 0 . . . 1 | RO | |
| mediaPlayerEntry | URL String | 0 . . . 1 | RO | A document or a pointer to a document that defines a media presentation e.g. MPD for DASH content or URL to a video clip file. |

In the case of uplink streaming, it is not clear what uplink ingest protocols are supported by TS26.512. Furthermore, it is not clear how the MSH would retrieve the entry point for uplink streaming (e.g. a URL for posting the media segments). Finally, only one URL is allowed. Therefore, even for download streaming, only one entry point is allowed, and alternative protocols are not possible to be offered.

Accordingly, embodiments may extend the Streaming Access object in at least one of the following ways:
1. Adding a uniform resource name (URN) to each uniform resource locator (URL) to signal the protocol.
2. Allow multiple Streaming Access objects, for example by making Steaming Access an array of objects, in which each element defines an equivalent service entry point.
3. The order of StreamAccess object may show the priority of the service entry, for example a service entry appearing before another one in the array is the preferred service between the two.

An example of the above design is shown in Table 2.

TABLE 2

Extended service entry

| Property name | Type | Cardinality | Usage | Description |
|---|---|---|---|---|
| provisioningSessionId | String | 1 . . . 1 | RO | Unique identification of the M1d Provisioning Session. |

TABLE 2-continued

Extended service entry

| Property name | Type | Cardinality | Usage | Description |
|---|---|---|---|---|
| StreamingAccess | Object array | 0 ... N | RO | |
| mediaServiceName | URN String | 0 ... 1 | RO | Unique identification of the media service that indicates the availability of the service at mediaEntry. |
| mediaEntry | Object area | 0 ... 1 | RO | A document or a pointer to a document that defines a media presentation e.g. MPD for DASH content or URL to a video clip file. |

In Table 2, the underlined rows show the design according to embodiments. The StreamingAccess object may be an array of objects, each of which has two items: mediaServiceName which uniquely identifies the used protocol (for example Dynamic Adaptive Streaming over Hypertext Transfer Protocol (DASH) Media Presentation Description (MPD), HTTP Live Streaming (HLS) m3u8, DASH-Industry Forum (IF) ingest), and mediaEntry which defines the URL for accessing that service.

Because the StreamingAccess object may be an array, multiple objects may represent an equivalent service, i.e. a UE can use any of them to access the same service.

Example 1

Example 1 may relate to downlink streaming with DASH and HLS using common media application format (CMAF) segments. In this example, two StreamingAccess objects are defined:

{[urn.iso.mpeg.dash.2012, http://companyA.com/manifest.mpd],
[urn.apple.hls.2015, http://companyA.com/manifest.m3u]}

In this example, two manifests are provided each of which is identified with a URN. Additionally, each manifest has a link to be downloaded. Both manifests point to the same CMAF content. Because the MPD link is listed first, it may be the preferred service to be used by the UE.

Example 2

Example 2 may relate to uplink streaming with DASH-IF ingest protocol profile 1 and profile 2:

{[urn:3gpp:5gms:content-protocol:dash-if-ingest:p1, http://companyA.com/profile1/],
[urn:3gpp:5gms:content-protocol:dash-if-ingest:p2, http://companyA.com/profile2/]}

In this example, two profiles of the same protocol are provided for upload along with a separate URL for each profile. Because profile 1 is listed first, it may be the preferred profile to be used by UE.

Accordingly, embodiments may provide a method for defining media service entry for uplink and downlink streaming wherein both the protocol identifier as well as the service entry URL are signaled, wherein multiple protocols and/or service entry points can be described in the media service entry, wherein the client can use any of them to access the service using different protocols and/or different entry points, wherein the order of service entry points define the preference order provided by the Application Service Provider and/or by the 5G network, wherein a single data structure is used cross 5GMS M5 interface for indicating the media service entry for both uplink and downlink.

Figure 5:
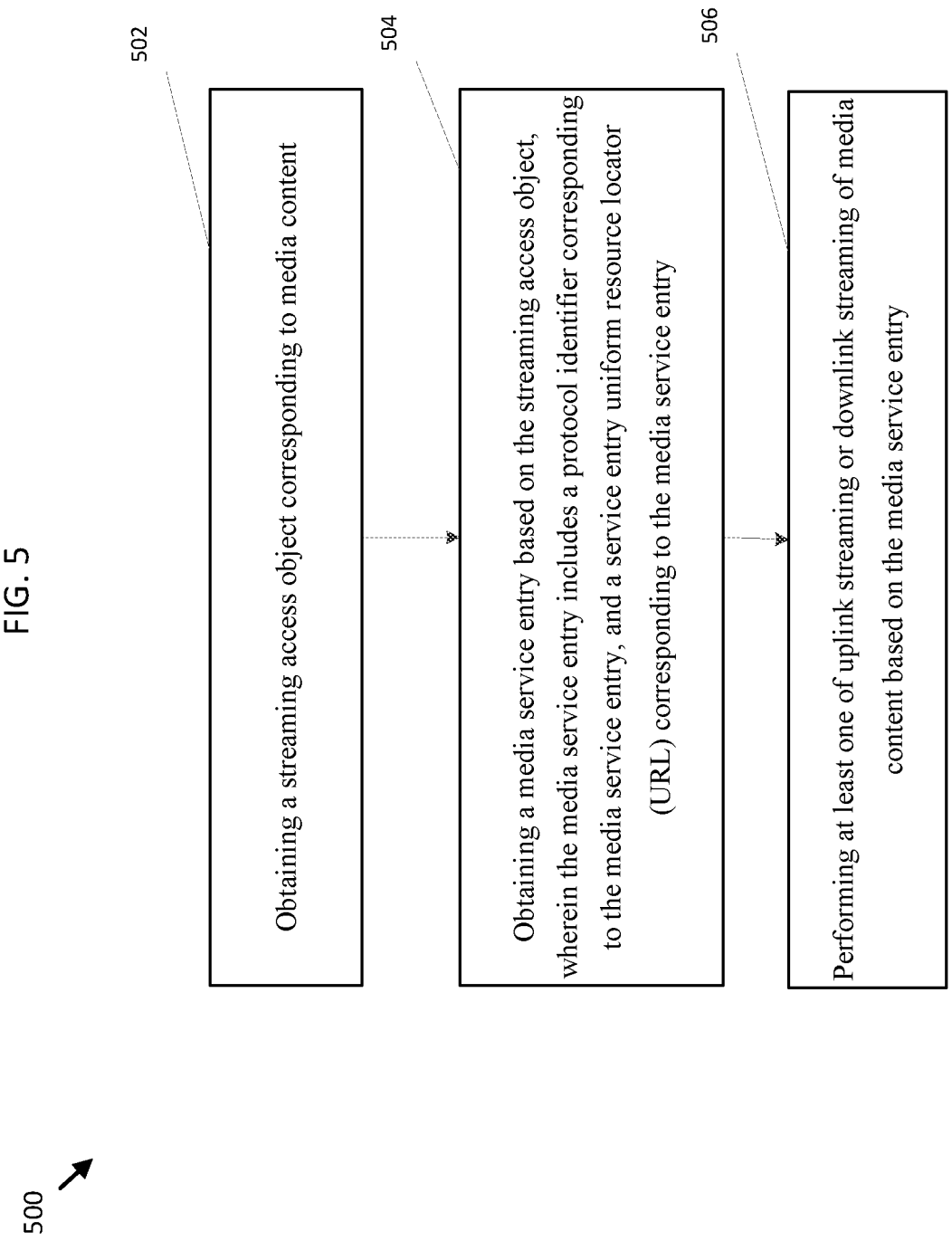
FIG. 5 is a flowchart of an example process for content preparation for a media streaming network, according to embodiments.

FIG. 5 is a flowchart of example process 500 of managing capabilities of a media streaming network, for example a 5GMS network. In some implementations, one or more process blocks of FIG. 5 may be performed by any of the elements discussed above with respect to FIGS. 1-4.

As shown in FIG. 5, process 500 may include obtaining a streaming access object corresponding to media content, for example 5GMS media content (block 502).

As further shown in FIG. 5, process 500 may include obtaining a media service entry based on the streaming access object, wherein the media service entry includes a protocol identifier corresponding to the media service entry, and a service entry uniform resource locator (URL) corresponding to the media service entry (block 504).

As further shown in FIG. 5, process 500 may include performing at least one of uplink streaming or downlink streaming of media content, for example the 5GMS media content, based on the media service entry (block 506). In embodiments, the media service entry may be consistent with a 5GMS M5 interface regardless of whether the media service entry is used for uplink streaming or downlink streaming of the 5GMS media content.

In embodiments, the protocol identifier may include a uniform resource name (URN) identifying the media service entry.

In embodiments, the URN may identify the media service entry as one from among a Dynamic Adaptive Streaming over Hypertext Transfer Protocol (DASH) Media Presentation Description (MPD) protocol, an HTTP Live Streaming (HLS) m3u8 protocol, and a DASH-Industry Forum (IF) ingest protocol.

In embodiments, the streaming access object may be included in an array of streaming access objects.

In embodiments, each streaming access object of the array of streaming access objects may identify a corresponding media service entry from among a plurality of media service entries.

In embodiments, a priority of the plurality of media service entries may be determined based on an order of the streaming access objects within the array of streaming access objects.

In embodiments, the streaming access object may correspond to a 5th generation media streaming (5GMS) M5 interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of managing capabilities of a 5G media streaming (5GMS) network using at least one processor, the method comprising:
    obtaining a streaming access object corresponding to 5GMS media content;
    obtaining a media service entry based on the streaming access object, wherein the media service entry includes a protocol identifier corresponding to the media service entry, and a service entry uniform resource locator (URL) corresponding to the media service entry; and
    performing at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content,
    wherein the streaming access object is included in an array of streaming access objects,
    wherein each streaming access object of the array of streaming access objects identifies a corresponding media service entry from among a plurality of media service entries, and
    wherein a priority of the plurality of media service entries is determined based on an order of the streaming access objects within the array of streaming access objects.

2. The method of claim 1, wherein the protocol identifier comprises a uniform resource name (URN) identifying the media service entry.

3. The method of claim 2, wherein the URN identifies the media service entry as one from among a Dynamic Adaptive Streaming over Hypertext Transfer Protocol (DASH) Media Presentation Description (MPD) protocol, an HTTP Live Streaming (HLS) m3u8 protocol, and a DASH-Industry Forum (IF) ingest protocol.

4. The method of claim 1, wherein the streaming access object corresponds to a $5^{th}$ generation media streaming (5GMS) M5 interface.

5. A device for managing capabilities of a 5G media streaming (5GMS) network, the device comprising:
    at least one memory configured to store program code; and
    at least one processor configured to read the program code and operate as instructed by the program code, the program code including:
    first obtaining code configured to cause the at least one processor to obtain a streaming access object corresponding to 5GMS media content;
    second obtaining code configured to cause the at least one processor to obtain a media service entry based on the streaming access object, wherein the media service entry includes a protocol identifier corresponding to the media service entry, and a service entry uniform resource locator (URL) corresponding to the media service entry; and
    performing code configured to cause the at least one processor to perform at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content,
    wherein the streaming access object is included in an array of streaming access objects,
    wherein each streaming access object of the array of streaming access objects identifies a corresponding media service entry from among a plurality of media service entries, and
    wherein a priority of the plurality of media service entries is determined based on an order of the streaming access objects within the array of streaming access objects.

6. The device of claim 5, wherein the protocol identifier comprises a uniform resource name (URN) identifying the media service entry.

7. The device of claim 6, wherein the URN identifies the media service entry as one from among a Dynamic Adaptive Streaming over Hypertext Transfer Protocol (DASH) Media Presentation Description (MPD) protocol, an HTTP Live Streaming (HLS) m3u8 protocol, and a DASH-Industry Forum (IF) ingest protocol.

8. The device of claim 5, wherein the streaming access object corresponds to a $5^{th}$ generation media streaming (5GMS) M5 interface.

9. A non-transitory computer-readable medium storing instructions, the instructions comprising: one or more instructions that, when executed by one or more processors of a device for managing capabilities of a 5G media streaming (5GMS) network, cause the one or more processors to:
obtain a streaming access object corresponding to 5GMS media content;
obtain a media service entry based on the streaming access object, wherein the media service entry includes a protocol identifier corresponding to the media service entry, and a service entry uniform resource locator (URL) corresponding to the media service entry; and
perform at least one of uplink streaming or downlink streaming of the 5GMS media content based on the media service entry, wherein the media service entry is consistent with a 5GMS M5 interface regardless of whether the media service entry is used for uplink streaming or downlink streaming of the 5GMS media content,
wherein the streaming access object is included in an array of streaming access objects,
wherein each streaming access object of the array of streaming access objects identifies a corresponding media service entry from among a plurality of media service entries, and
wherein a priority of the plurality of media service entries is determined based on an order of the streaming access objects within the array of streaming access objects.

10. The non-transitory computer-readable medium of claim 9, wherein the protocol identifier comprises a uniform resource name (URN) identifying the media service entry.

11. The non-transitory computer-readable medium of claim 9, wherein the streaming access object corresponds to a $5^{th}$ generation media streaming (5GMS) M5 interface.

* * * * *